(12) United States Patent
Huber et al.

(10) Patent No.: US 10,994,943 B2
(45) Date of Patent: May 4, 2021

(54) METHOD FOR OPERATING A LONG STATOR LINEAR MOTOR WITH TRANSPORT UNITS AND COLLISION MONITORING

(71) Applicant: B&R INDUSTRIAL AUTOMATION GMBH, Eggelsberg (AT)

(72) Inventors: Stefan Huber, Eggelsberg (AT); Dominic Walter, Eggelsberg (AT); Benjamin Reichenwallner, Eggelsberg (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 5 days.

(21) Appl. No.: 16/520,855

(22) Filed: Jul. 24, 2019

(65) Prior Publication Data
US 2020/0031591 A1    Jan. 30, 2020

(30) Foreign Application Priority Data
Jul. 25, 2018    (EP) .................................... 18185540

(51) Int. Cl.
| | |
|---|---|
| *H02K 41/02* | (2006.01) |
| *B65G 54/02* | (2006.01) |
| *H02P 25/06* | (2016.01) |
| *B65G 43/08* | (2006.01) |
| *B65G 47/64* | (2006.01) |

(52) U.S. Cl.
CPC .............. *B65G 43/08* (2013.01); *B65G 47/64* (2013.01); *B65G 2203/0233* (2013.01)

(58) Field of Classification Search
CPC ...... H02K 41/02; H02K 41/031; H02P 25/06; H02P 6/006; B65G 43/08; B65G 54/02

USPC .................................................. 198/572, 619
See application file for complete search history.

(56) References Cited

U.S. PATENT DOCUMENTS

| | | | | |
|---|---|---|---|---|
| 5,634,565 | A * | 6/1997 | Lesage .................. | B66C 15/045 212/276 |
| 7,034,669 | B2 * | 4/2006 | Lamb ...................... | G08G 7/02 340/436 |
| 8,751,060 | B2 * | 6/2014 | Kinoshita ............ | G05D 1/0289 701/2 |
| 8,863,669 | B2 * | 10/2014 | Young ..................... | H02P 6/006 104/292 |
| 8,967,051 | B2 * | 3/2015 | King ...................... | B60L 13/10 104/284 |

(Continued)

FOREIGN PATENT DOCUMENTS

| | | |
|---|---|---|
| EP | 2 639 187 | 9/2013 |
| EP | 3 196 719 | 7/2017 |

(Continued)

OTHER PUBLICATIONS

US 2020/0036276 A1, Huber et al., Jan. 30 (Year: 2020).*

(Continued)

*Primary Examiner* — Douglas A Hess
(74) *Attorney, Agent, or Firm* — Greenblum & Bernstein, P.L.C.

(57) ABSTRACT

In order to easily prevent a collision of transport units, which are moved along a conveyor line of a long stator linear motor, it is provided that a minimum distance to be maintained between the two transport units is changed as a function of the position of the two transport units along the conveyor line.

9 Claims, 4 Drawing Sheets

(56) References Cited

U.S. PATENT DOCUMENTS

| | | | | |
|---|---|---|---|---|
| 9,346,371 B2* | 5/2016 | King | | B65G 19/02 |
| 9,540,190 B2* | 1/2017 | Jochim | | B65G 54/02 |
| 9,882,520 B2* | 1/2018 | Huber | | B65G 43/00 |
| 10,106,331 B2* | 10/2018 | Radak | | B60L 13/03 |
| 10,118,775 B2* | 11/2018 | Walter | | B60L 13/03 |
| 10,220,862 B2* | 3/2019 | Huber | | B60L 13/03 |
| 10,370,195 B2* | 8/2019 | Huber | | B65G 23/23 |
| 10,432,117 B1* | 10/2019 | Huang | | B65G 23/00 |
| 10,442,637 B2* | 10/2019 | Huang | | B60L 15/38 |
| 10,594,245 B2* | 3/2020 | Plainer | | H02P 25/064 |
| 10,608,518 B2* | 3/2020 | Brucker | | H02K 41/031 |
| 10,618,750 B2* | 4/2020 | Brucker | | H02K 41/02 |
| 10,622,921 B2* | 4/2020 | Weber | | H02P 25/062 |
| 10,717,365 B2* | 7/2020 | Huang | | B65G 19/02 |
| 2013/0245818 A1 | 9/2013 | Eberle et al. | | |
| 2017/0212494 A1 | 7/2017 | Bhatt et al. | | |

FOREIGN PATENT DOCUMENTS

| | | |
|---|---|---|
| EP | 3 202 612 | 8/2017 |
| JP | 5-303423 | 11/1993 |

OTHER PUBLICATIONS

Europe Office Action/Search Report conducted in countepart Europe Appln. No. 18185540.4 (dated Feb. 15, 2019) (w/ machine translation).

* cited by examiner

METHOD FOR OPERATING A LONG STATOR LINEAR MOTOR WITH TRANSPORT UNITS AND COLLISION MONITORING

CROSS-REFERENCE TO RELATED APPLICATIONS

The present application claims priority under 35 U.S.C. § 119(a) of Europe Patent Application No. 18185540.4 filed Jul. 25, 2018, the disclosure of which is expressly incorporated by reference herein in its entirety.

BACKGROUND

1. Field of the Invention

The present invention relates to a method for operating a conveyor in the form of a long stator linear motor having a conveyor line along which at least two transport units travel in succession, wherein it is checked during the movement of the two transport units, whether a predetermined minimum distance between the two transport units is maintained to a avoid collision of the two transport units, wherein the minimum distance to be maintained is changed in dependence on the position of the two transport units along the conveyor line, and a corresponding conveyor.

2. Discussion of Background Information

Long stator linear motors are often used as flexible conveyors in manufacturing, machining, assembly, and similar facilities. A long stator linear motor is known to consist essentially of a long stator in the form of a plurality of successively arranged drive coils and a plurality of transport units having excitation magnets (permanent magnets or electromagnets) which are moved along the long stator by the drive coils by applying electric current accordingly in the region of a transport unit. A moving magnetic field is generated by the drive coils, which interacts with the excitation magnets on the transport units to move the transport units. The long stator thus forms a conveyor line, along which the transport units can be moved. This makes it possible to control each transport unit in their movement individually and independently of each other (position, speed, acceleration). For this purpose, each drive coil required for the movement can be controlled by an associated drive coil controller, which can receive instructions for moving a transport unit from a higher-level system control unit (e.g. in the form of setpoint values for position or speed). In this case, it is also possible to provide switches of the long stator linear motor along the conveyor path in order to be able to move a transport unit on different transport sections which are connected by the switch. Often, the long stator is also constructed in the form of conveyor segments, each conveyor segment forming part of the conveyor line and containing a number of drive coils. In most cases, a segment controller is provided for a conveyor segment, which controls all drive coils of the conveyor segment, for example by means of subordinate coil controllers per drive coil. Almost any conveyer lines can also be formed, for example, with straight lines, curves, closed paths, etc. The structural design of the long stator linear motor, so for example the design of the drive coil, the conveyor line, the transport units, the guides of the transport unit, etc., and the control concept can of course be different, but the basic operating principle of a long stator linear motors remains the same.

A conveyor in the form of a long stator linear motor can be quite complex, even with several transport sections that can be interconnected by switches. A large number of transport units can also be moved on it simultaneously. Such a conveyor thus places high demands on the control of the movement of the individual transport units. In particular, precautions must be taken as a rule that individual transport units do not collide with each other during their movement.

The need for collision avoidance is also known by other conveyors. For example, JP H05 303423 A shows a conveyor having vehicles that are moved along a conveyor line. The distance between two consecutive vehicles is monitored on a straight line by distance sensors on the vehicles. In a curve sensors are provided on the vehicles or on the path to ensure compliance with a minimum distance between two vehicles traveling in succession. Such a procedure requires a high amount of hardware on additional sensors.

For example, U.S. Pat. No. 8,863,669 B2 describes a conveyor in the form of a long stator linear motor having a control of the movement of the transport units. Therein, the conveyor line is divided into zones, wherein a transport unit is controlled in a setpoint value-based zone based on a setpoint specification and is controlled in a limit-based zone by means of end position and maximum values for speed and acceleration. In case of limit value-based control, these specifications are converted into a motion profile with which the transport unit is moved. U.S. Pat. No. 8,863,669 B2 also mentions that collisions of the transport units are to be avoided, but no comments are made as to how this is achieved.

EP 3 196 719 A2 describes that the length of a transport unit in the direction of movement opposite to the direction of movement can be extended by a predetermined minimum collision avoidance distance. A further transport unit traveling behind this transport unit must then at least keep its distance so far that it can stop by controlled deceleration before the length of the transport unit extended by the collision avoidance distance. The collision avoidance distance is hereby configured.

In EP 3 202 612 A1, a predictive check is made for a transport unit as to whether a standstill maneuver with predetermined kinematics can be carried out so that a collision with a preceding transport unit can be prevented and, if not, the standstill maneuver is initiated. In this case, after the execution of the standstill maneuver, an achieved minimum distance may be required in which a safety margin and also the dimension of the transport unit in the direction of movement can be mapped.

Both the minimum distance and the collision avoidance distance are regarded as parameters to be specified without specifying how they are determined. In order to avoid collisions, however they are usually set conservatively. However, this leads to the fact that in the vast majority of cases, transport units traveling in succession cannot drive as close to each other, as, in principle, it would be possible. Of course, this also limits the number of transport units movable per unit of time along the transport path, which is disadvantageous in many conveying applications.

SUMMARY

Embodiments of the subject invention provide a method with which a collision of transport units, which are moved along a conveyor line of a long stator linear motor, can be prevented in a simple manner, while a minimum distance to be maintained of two transport units traveling in succession can be optimized.

In embodiments, it possible to adjust the minimum distance to the respective location of the transport units. When at least one transport unit is moved on a curved conveyor section, a different minimum distance may be used than with two transport units moving on a straight conveyor section. It is also possible that for conveyor sections with different curves appropriate measures can be taken, by applying different minimum distances as a function of the curve or even in dependence on the position of a transport unit in the curve. Thus, depending on the respective position along the conveyor line, the most optimal minimum distance between two consecutively moving transport units can always be used, whereby the total throughput of transport units along the conveyor line can also be increased.

In addition, the minimum distance to be maintained can also be changed depending on the dimensions of the two transport units, whereby the respective dimensions of the transport units and the parts to be transported can be taken into account.

According to embodiments, the minimum distance is determined from the extensions of the two transport units in the conveying direction and a positional proportion is added to an extension of at least one transport unit on a curved conveyor section in dependence on the position and/or in dependence on the dimension of the transport unit. This can advantageously be carried out by determining for a preceding transport unit a largest extension of the transport unit against the conveying direction with respect to a reference point of the transport unit and for a transport unit traveling in succession a largest extension of the transport unit in the conveying direction with respect to a reference point of the transport unit and by determining the minimum distance as the sum of the two dimensions in and against the conveying direction and the at least one positional proportion.

If a center point of the transport units is used as the reference point, the minimum distance can be determined in a simplified manner as the sum of the respective half extension of the two transport units in the conveying direction and of the at least one positional proportion.

In order to take the local conditions of the conveyor section even better in consideration, a positional proportion seen in the conveying direction in front and behind the transport unit may also be different.

An embodiment of the invention that is easy to implement provides for a transport unit on a curved conveyor section with a radial projection through a center of curvature of the conveyor section an extension of the transport unit in direction of the conveying direction is determined that is projected onto a reference path and the minimum distance is determined with this projected extension. This can be done with simple arithmetic operations, which also allows a running calculation of the minimum distance in the operation of the conveyor.

In order to be able to realize a collision avoidance with the method according to the invention also in the area of a switch, it can be provided for a passage of two transport units traveling in succession through a switch with two conveyor sections, wherein each of the two transport units is moved in the area of the switch on another conveyor section, that a transport unit on a conveyor section is projected onto the respective other conveyor section, and compliance with the minimum distance between the projected transport unit and the other transport unit is checked. In this case, it may be advantageous to additionally consider the geometry of the switch when determining the minimum distance in the area of the switch.

Other exemplary embodiments and advantages of the present invention may be ascertained by reviewing the present disclosure and the accompanying drawing.

BRIEF DESCRIPTION OF THE DRAWINGS

In the following, the present invention is described in greater detail with reference to FIGS. 1 to 6 which, by way of example, show schematic and non-limiting advantageous embodiments of the invention. In the drawings

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
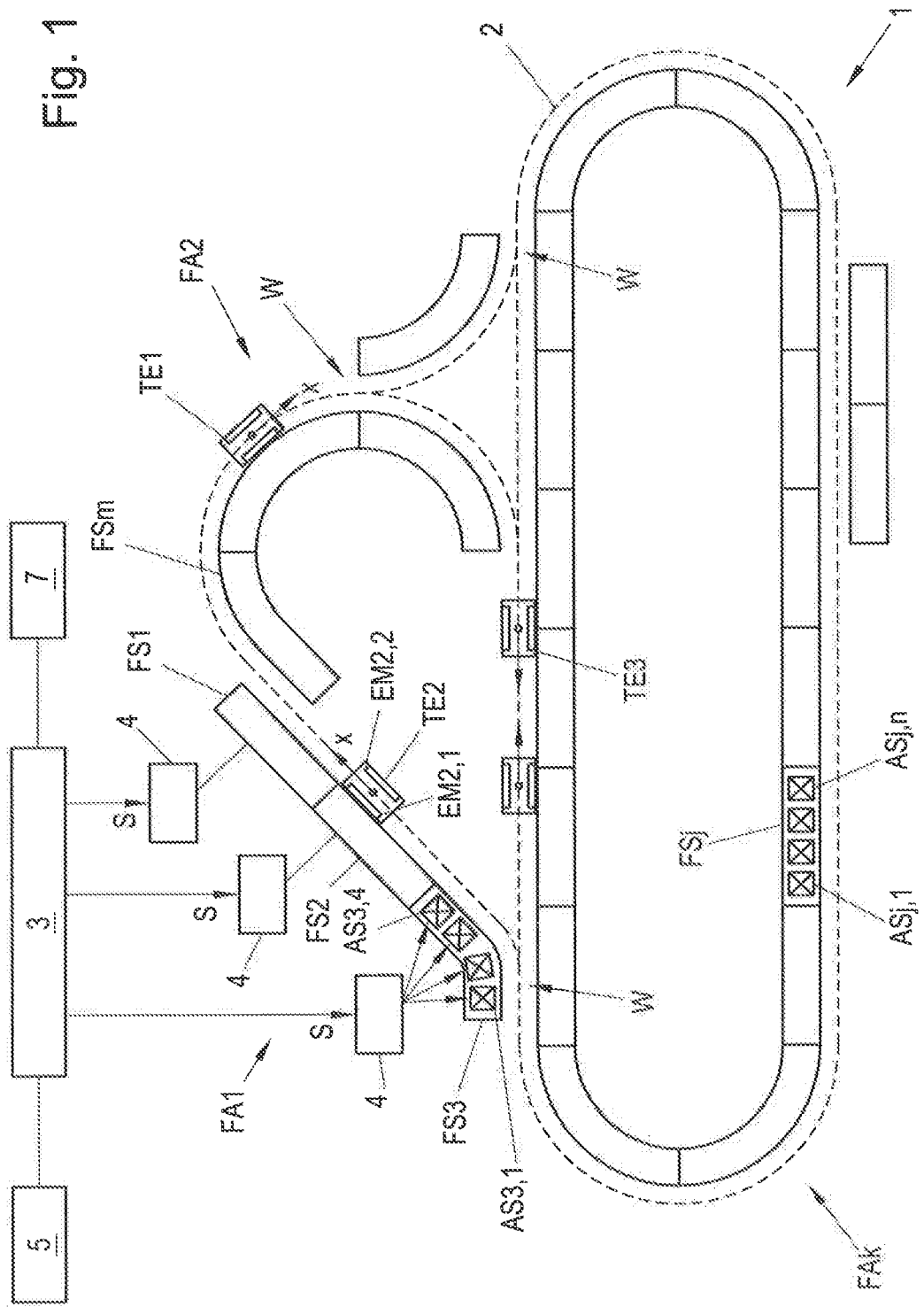
FIG. 1 shows an embodiment of a conveyor in the form of a long stator linear motor.

FIG. 1 shows an example of an arbitrary structure of a conveyor 1 with a conveyor line 2 (indicated by the dashed line). The conveyor 1 is designed as a long stator linear motor and a plurality of transport units $TE_i$, $i \in \mathbb{N}$ are provided, which can be moved along the conveyor line 2. The conveyor line 2 is essentially defined by the stationary long stator of the long stator linear motor 1. In the exemplary embodiment shown, a number of conveyor segments $FS_j$, $j \in \mathbb{N}$ are provided, which define the path of the transport units $TE_i$, that is to say the conveyor line 2. Individual conveyor sections $FA_k$, $k \in \mathbb{N}$ of the conveyor line 2 can be formed by a number of juxtaposed conveyor segments $FS_j$. The conveyor segments $FS_j$, and thus also the conveyor sections $FA_k$, thereby form part of the long stator of the long stator linear motor. The conveyor segments $FS_j$, or generally the conveyor sections $FA_k$, are fixedly arranged on a suitable construction and as a rule also form guide elements along which the transport unit $TE_i$ can be guided and held. Each conveyor section $FA_k$ comprises at least one conveyor segment $FS_j$, normally several conveyor segments $FS_j$. Individual conveyor sections $FA_k$, or conveyor segments $FS_j$ of individual conveyor sections $FA_k$ (such as the conveyor segments $FS_1$, $FS_m$), may also partially overlap along the conveyor line 2 in the conveying direction x on different sides of the transport unit $TE_i$, especially at locations of the conveyor line 2 at which the one transition from a conveyor section $FA_k$ on one side to another conveyor section $FA_k$ on the other side (such as from the conveyor section FA1 to the conveyor section FA2) takes place. It can also be provided that conveyor segments FSj are arranged in sections on both sides of the conveyor line 2. Switches W may also be provided, on which (depending on the conveying direction of a transport unit TEi) two conveyor sections FAk are brought together or a division into two conveyor sections FAk takes place. It is understandable that a conveyor line 2 of almost any design can thus be formed, which also need not only be in a two-dimensional plane, but can also extend in three dimensions.

Each conveyor segment FSj comprises a number n of drive coils ASj,n, j∈ℕ , n∈ℕ arranged next to one another in the conveying direction x, wherein the number n does not have to be the same for each conveyor segment FSj. In FIG. 1, for the sake of clarity, only drive coils ASj,n of some conveyor segments FSj are shown. Each transport unit TEi comprises a number m of excitation magnets EMi,m, i∈ℕ , m∈ℕ (permanent magnets or electromagnets), preferably on both sides (relative to the conveying direction x, which is indicated by the arrows on the transport units TEi) of the transport unit TEi. The drive coils ASj,n generate a moving magnetic field and interact in the operation of the conveyor 1 in a known manner according to the motor principle with the excitation magnet EMi,m of the transport units TEi in the field of drive coils ASj,n. If the drive coils ASj,n are energized in the region of a transport unit TEi with a coil current by applying a coil voltage, a magnetic flux is produced which, in cooperation with the excitation magnets EMi,m causes a force on the transport unit TEi. Depending on the coil current, this force can comprise, as is known, a propulsion force-forming and/or a lateral force-forming force component. The propulsion force-forming force component essentially serves for the movement of the transport unit TEi in the conveying direction and the lateral force-forming force component can be used to guide the transport unit TEi, but also to steer the transport unit TEi in a switch W. In this way, each transport unit TEi can be moved individually and independently along the conveying path 2 by supplying the drive coils ASj,n in the region of each transport unit TEi with a corresponding coil current in accordance with the movement to be carried out.

This basic operation of a long stator linear motor is well known, so it will not be discussed further. For the subject invention, it is also irrelevant how the transport units TEi, the conveyor segments FSj, the drive coils ASj,n, the excitation magnets EMi,m, etc. are structurally and specifically designed and shaped, which is why this will not be discussed in detail.

In order to control the movement of the individual transport units TEi, a transport unit control 3 (hardware and/or software) is provided in which the setpoint values S for the movement of the transport units TEi are generated or determined. Of course, it is equally possible to provide a plurality of transport unit controls 3, which are each assigned to a part of the conveyor 1, e.g. a conveyor section FAk, and which control the movement of the transport units TEi on this part. In addition, segment control units 4 (hardware and/or software) can be provided, which are assigned to a conveyor segment FSj (or to several conveyor segments FSj or also to a part of a conveyor segment FSj) and which convert the setpoint specifications of the associated transport unit control 3 for a transport unit TEi into coil currents for the associated drive coils ASj,n, that is to say into concrete manipulated variables such as coil voltages. However, the segment control units 4 could also be implemented or integrated in a transport unit control 3. The manipulated variables can then be used in a power electronics, not shown, to generate an electrical variable, such as current or voltage, and apply it to the drive coils ASj,n. For example, positions p of the transport units TEi along the conveyor line 2, or equivalently also speeds v, can be specified as desired values S. This means that a new setpoint S is calculated or predetermined for each transport unit TEi in each timing step of the control and which is adjusted by the segment control units 4. Accordingly, a suitable controller is implemented in a segment control unit 4, which converts the setpoint specification into a suitable manipulated variable, for example into a driving force or a coil current, from which, in turn, coil voltages for the individual drive coils ASj,n are determined.

The desired movement of the transport units TEi along the conveyor line 2 can also be predetermined by a conveyor control 5 (hardware and/or software), in which, for example, a route calculation (e.g. which way should a transport unit TEi take?), a switch arbitration (e.g. which transport unit TEi may enter a switch?), deadlock avoidance (e.g. are two transport units TEi blocking each other?), etc., can take place to move the transport units TEi in a desired manner along the conveyor line 2, for example, to realize a manufacturing, assembly, or other process. This movement specification for the transport units TEi is implemented in the transport unit control 3 in setpoint specifications for the transport units TEi. For this purpose, a movement profile can be specified for a transport control unit 3, for example a path-time profile, or a target position or a target speed, from which a movement profile is then calculated.

In principle, it should be ensured in the conveyor control 5 or the transport unit control 3 that no inadmissible states occur on the conveyor line 2. This primarily comprises the avoidance of a collision of two transport units TEi on the conveyor line 2. For this purpose, a separate collision monitoring unit 7 (hardware and/or software) may be provided, which may also be implemented or integrated in the conveyor control 5 or the transport unit control 3. In order to avoid a collision, in particular a certain minimum distance M is to be maintained between two transport units TEi, TEi+1 traveling in succession. The minimum distance M to be maintained has so far been simply configured in order to reliably avoid a collision.

Figure 2:
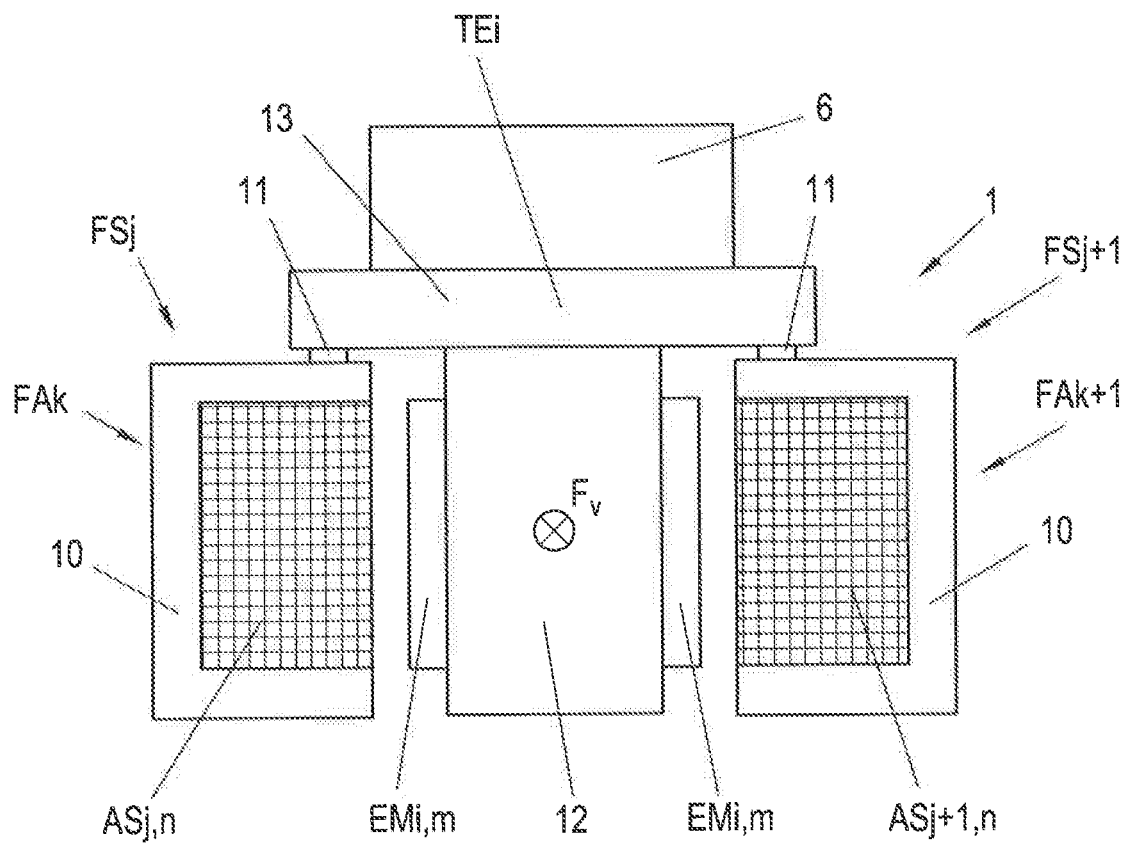
FIG. 2 shows a cross section through the conveyor line and a transport unit.

A transport unit TEi is embodied, for example, as shown in FIG. 2. FIG. 2 shows a cross-section through an arbitrary part of the conveyor line 2 with conveyor sections FAk, FAK+1 on both sides and a transport unit TEi moving thereon. In the exemplary embodiment shown, a transport unit TEi consists of a base body 12 and a component receptacle 13 arranged thereon for receiving a part 6 to be transported, wherein the component holder 13 can in principle be arranged at an arbitrary position of the main body 12, in particular also on the underside for hanging parts. The number of excitation magnets EMi,m is arranged on the base body 12, preferably on both sides of the transport unit TEi. The conveyor line 2 of the conveyor 1, or of a conveyor section FAk, FAk+1, is formed by a stationary guide construction 10, on which the drive coils ASj,n, ASj+1,n are arranged. The base body 12 with the excitation magnets EMi,m arranged as permanent magnets on both sides is arranged between the drive coils ASj,n, ASj+1,n in the exemplary embodiment shown. Thus, in each case at least one excitation magnet EMi,m is arranged opposite of a drive coil ASj,n, ASj+1,n (or a group of drive coils) and thus interacts with at least one drive coil ASj,n, ASj+1,n to generate a driving force F, together. Thus, the transport unit TEi is movable between the guide structure 10 with the drive coils ASj,n, ASj+1,n and along the conveyor path 2. Of course, other arrangements of the drive coils ASj,n, ASj+1,n and the interacting excitation magnet EMi,m are conceivable. For example, it is also possible to arrange the drive coils ASj,n, ASj+1,n inside and the excitation magnets EMi,m inwardly and to arrange the drive coils ASj,n, ASj+1,n to encompass each other. Likewise, drive coils ASj,n, ASj+1,n may be provided on a guide structure 10 on a conveyor section FAk, FAk+1 also only on one side (viewed in the conveying direction x).

Naturally, guide members 11, such as rollers, wheels, sliding surfaces, magnets, etc. (not shown here for reasons of clarity or only implied) can also be provided on the base body 12 and/or on the component receptacle 13 in order to guide the transport unit Tn along the transport route 2. The guide elements 11 of the transport unit TE1 act together to guide with the stationary guide structure 10, for example, in which the guide elements 11 are supported on the guide structure 10, slide off it or roll off it, etc. But the guiding of the transport unit TEi, in addition to mechanical guides also (alternatively or additionally), can also be done by the provision of guide magnets.

Figure 4:
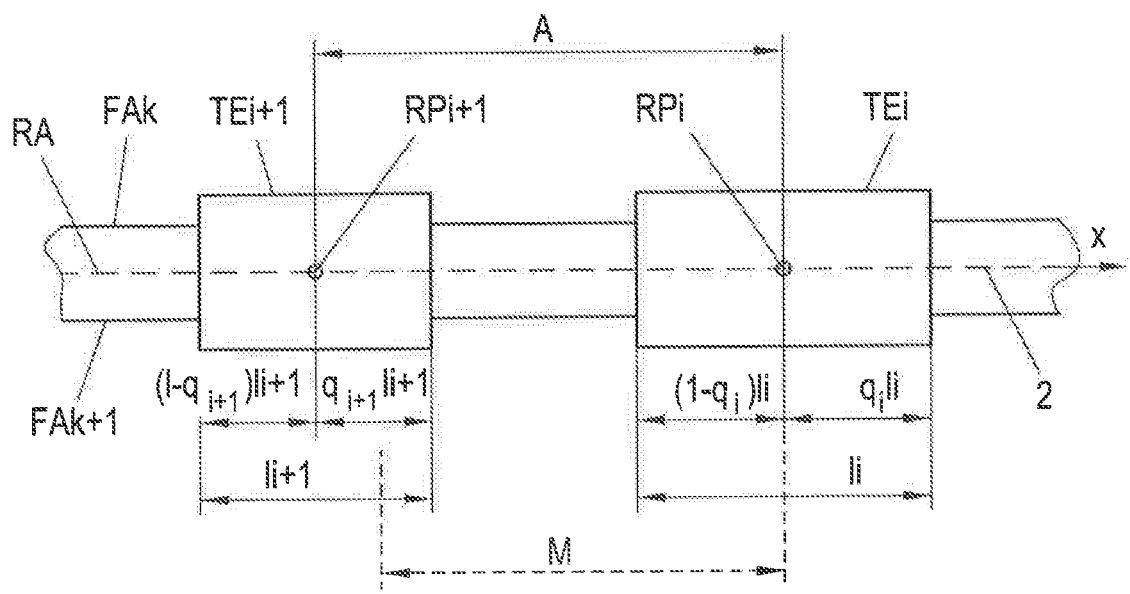
FIG. 4 shows the distance between two transport units on a straight section.
Figure 3:
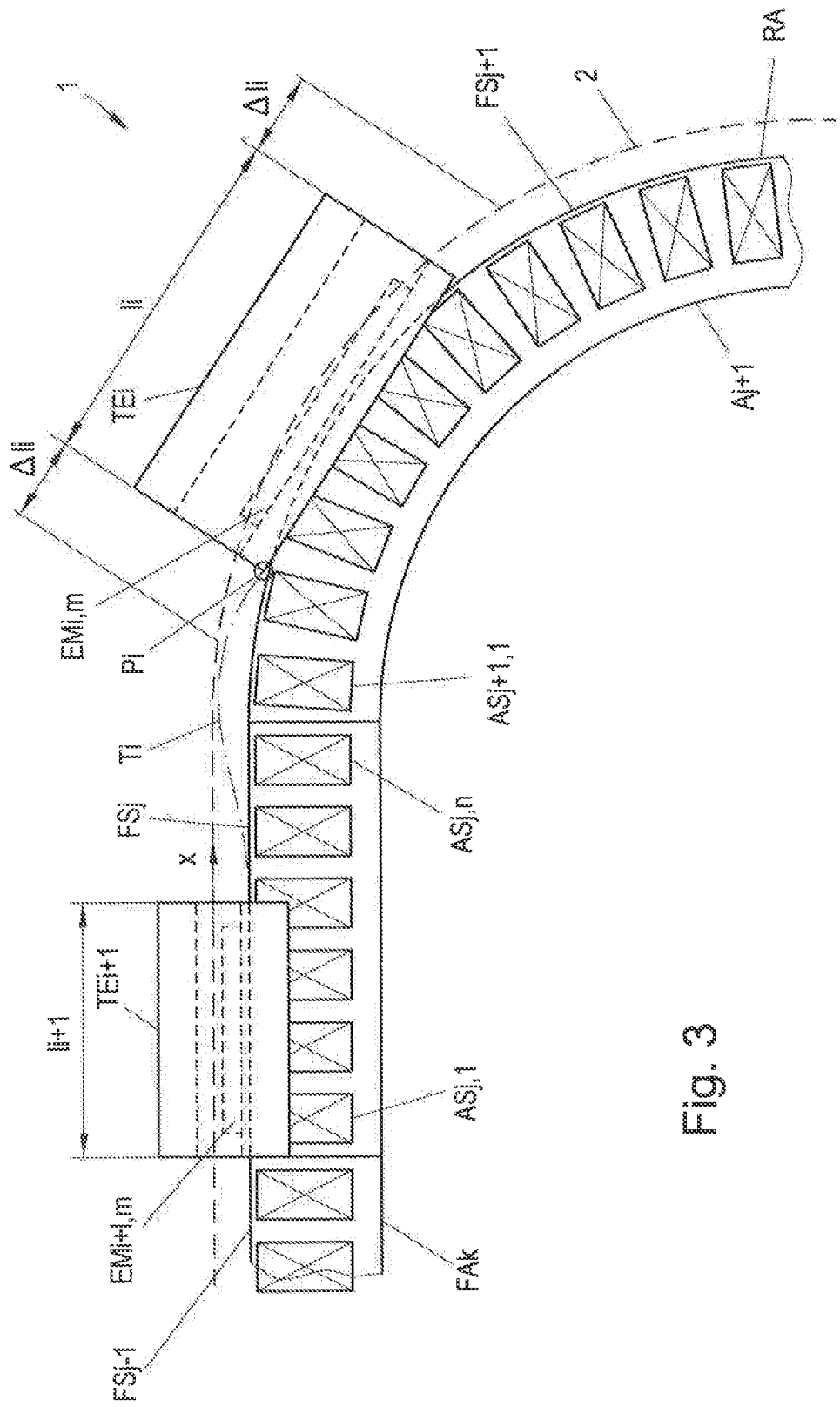
FIG. 3 shows a section of the conveyor line of the conveyor with two transport units.
Figure 5:
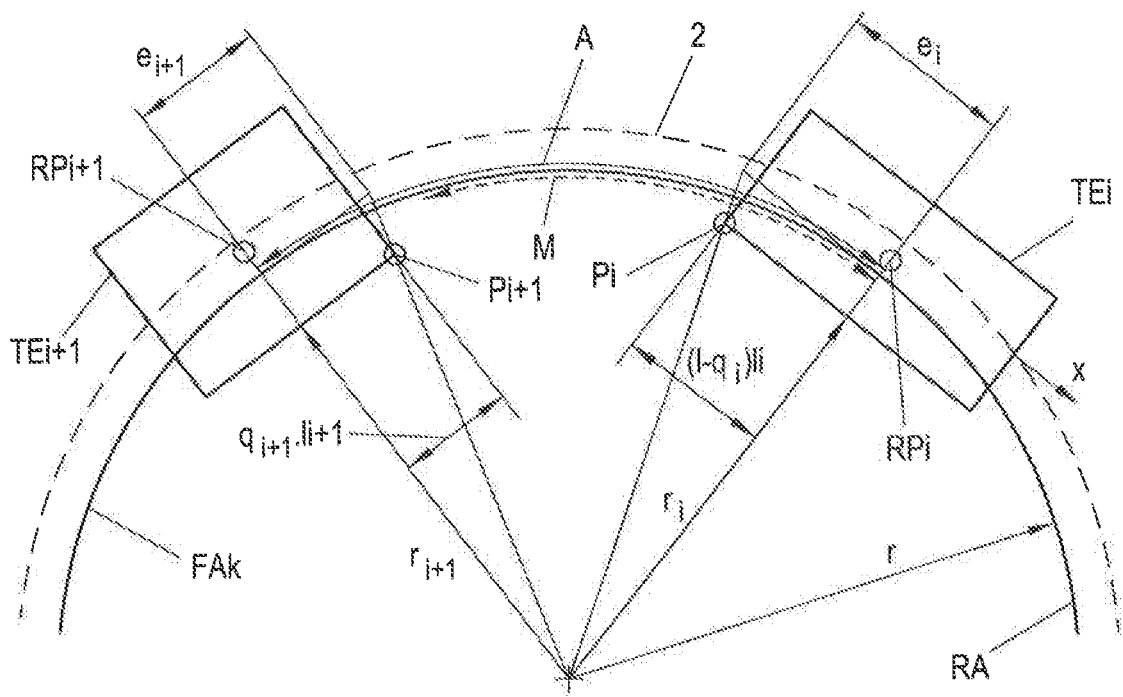
FIG. 5 shows the distance between two transport units on a curved section.

In FIG. 3, a part of a conveyor line 2 of a conveyor 1 is shown. Shown is an arbitrary conveyor section FAk with conveyor segments FSj−1, FSj, FSj+, where the conveyor segment FSj+1 is curved and the others are straight. At each conveyor segment FSj−1, FSj, FSj+1 drive coils ASj,n are arranged in succession as described. The control units 3, 4, 5 are not shown for reasons of clarity. The conveyor segments FSj−1, FSj, FSj+1, or generally the conveyor section FAk, are arranged stationary. Along the conveyor segments FSj−1, FSj, FSj+1, or generally along the conveyor section FAk, the transport units TEi, TEi+1 move in succession at a certain distance A. Of course, the distance A is related to a predetermined reference path RA of the transport unit TEi along the conveyor line 2, for example in the middle between two conveyor sections FAk, FAk+1 (as shown in FIG. 4), which are located next to one another in the conveying direction x, or in the middle of the air gap between the drive coil ASj,n, ASj+1,n and the excitation magnet EMi,m, or even on the side surface of a conveying section FAk, FAk+1 facing a transport unit TEi (as shown in FIG. 5), and is given on a curved section as arc length. At this reference path RA, a setpoint position for the control of the movement of the transport unit TEi is preferably also specified.

When a transport unit TEi is moved along a curved portion of the conveyor line 2, the inherently rigid transport unit TEi will deflect due to the guide at the curved portion. A point Pi on the transport unit TEi thus follows, when the transport unit TEi moves along the conveyor line 2, a trajectory Ti which is substantially dependent on the dimensions of the transport unit TEi and the curvature. A part 6 transported with the transport unit TEi is hereby taken into account. That is, the part 6 is seen as part of the transport unit TEi, which can co-determine the dimension, if the part 6 projects from the transport unit TEi, for example, in the conveying direction x and/or transversely thereto. Of course, different points Pi on the transport unit TEi can cause different trajectories Ti. As a result of this deflection, however, the distance A between the transport unit TEi, more precisely between the point Pi of the transport unit TEi, and a point Pi+1 of a transport unit TEi+1 driving behind it, can also be reduced.

In order to avoid a possible collision between the preceding transport unit TEi and a subsequent transport unit TEi+1 in this situation, according to the invention, the minimum distance M to be maintained between the two transport units TEi, TEi+1 is changed, usually increased, in order to compensate for a deflection.

However, the same situation also arises if the preceding transport unit TEi is moved on a straight section, but the transport unit TEi+1 traveling behind it is moved on a curved section. Here, too, the two transport units TEi, TEi+1 can come closer to one another on the curved section alone due to the deflection of the transport unit TEi+1, so that a collision may possibly not be avoided without countermeasure.

However, even if the two transport units TEi, TEi+1 are both moved on a curved section, this situation may result that, as a result of the deflection of one (or both) transport units TEi, TEi+1, there is an undesired approach of the two transport units TEi, TEi+1. In this case, it may also be the case that the two transport units TEi, TEi+1 come closer by the deflection alone, so that a collision may possibly not be avoided without countermeasure.

Therefore, according to the invention, the minimum distance M between two transport units TEi, TEi+1 traveling in succession is made dependent on the position along the conveyor line 2. In doing so, a different minimum distance M is used for the case that both transport units TEi, TEi+1 are moved on a straight conveyor section FAk, as in the case that at least one of the two transport units TEi, TEi+1 is moved on a curved conveyor section FAk. In the latter case, the minimum distance M to be maintained will usually be greater than in the first case. The minimum distance M between two transport units TEi, TEi+1 traveling in succession can thus change dynamically in the operation of the conveyor 1. Thus, the minimum distance M to be maintained between two transport units TEi, TEi+1, which are both moved on a straight section, may be, for example, smaller than a minimum distance M to be maintained between two transport units TEi, TEi+1 of which at least one is moved on a curved section.

It may naturally be the case that the minimum distance M is dependent not only on the position of the two transport units TEi, TEi+1 along the conveyor line 2, but also on the dimensions of the transport units TEi, TEi+1 (taking into account, if appropriate, the transported part 6). Transport units TEi, TEi+1 with different extensions li, li+1 in transport direction x and/or with different widths or shapes can naturally cause different deflections in curved conveyor sections FAk, which can be taken into account in the minimum distance M to be maintained.

The adaptation of the minimum distance M can be carried out continuously, that is, for example, in each predetermined cycle step of the control of the movement of the transport units TEi, TEi+1 at the respective position of the transport units TEi, TEi+1. The adaptation can also be discontinuous. If, for example, both transport units TEi, TEi+1 are moved in succession on a straight conveyor section FAk, FAk+1, a first minimum distance M can be used. If at least one of the transport units TEi, TEi+1 moving in succession is moved on a curved conveyor section FAk, another minimum distance M can be used.

FIG. 4 shows, for example, a straight section of the conveyor line 2, on which two transport units TEi, TEi+1 are moved in succession in the conveying direction x. The minimum distance M is related to a reference point RPi, RPi+1 on the transport units TEi, TEi+1, for example to a center point (as in FIG. 4) or to the foremost or rearmost point (viewed in the conveying direction x), or to any other point. Likewise, the distance A between the two transport units TEi, TEi+1 is related to this reference point RPi, RPi+1. The reference path RA, for example, is the middle seen transversely to the conveying direction x between two adjacent conveying sections FAk, FAk+1, which in the case of the straight conveying section FAk has no significance anyway.

In general, a transport unit TEi, TEi+1 extends differently from the reference point RPi, RPi+1 in the conveying direction x and against the conveying direction x, which can be expressed by a factor q. Thus, the minimum distance M (in the example shown) trivially results at least as $M=[q_{i+1} \cdot li+1+(1-q_i) \cdot li]$, and the distance A must have at least this minimum distance M. The distance A can be determined, for example, from the current actual positions (or also setpoint positions) of the two transport units TEi, TEi+1 (which in turn are related to the reference points RPi, RPi+1), which are known in the control of the movement. For example, the current actual positions are detected by means of position sensors.

If at least one transport unit TEi, TEi+1 is moved on a curved conveyor section FAk, the minimum distance M used for a straight section no longer has to be sufficient, as explained with reference to FIG. 5. Here two transport units TEi, TEi+1 are moved on a curved conveying section FAk (e.g. in the form of a circular arc). At the reference path RA (in this case, the side surface of the conveying section FAk), a distance A results as the arc length between the two transport units TEi, TEi+1 (relative to the reference point RPi, RPi+1). The distance A can again be determined from the actual positions (or also setpoint positions). Due to the deflection of the transport units TEi, TEi+1, the two transport units TEi, TEi+1 approach radially inward. Thus, it may be that the two transport units TEi, TEi+1 touch radially inwardly depending on the dimensions and/or the curvature of the conveying section FAk, although the distance A does not fall below the minimum distance M for the straight section. In this case, therefore, the minimum distance M to be maintained is to be increased as a function of the position (e.g. curvature of the curve at the given position) and/or of the dimensions.

In order to realize the position-dependent change of the minimum distance M, for example, a positional proportion $\Delta li$ for extension li in the conveying direction x can be added to each transport unit TEi in dependence on its position along the conveyor line 2 at the corresponding end (in the conveying direction x) of the transport unit TEi (as indicated in FIG. 3). In the transport unit TEi moving in front, the positional proportion $\Delta li$ is added at least at the rear end and at the transport unit TEi+1 moving behind at least at the front end. If several transport units TEi, TEi+1 travel in succession, it is also possible in certain circumstances to add at a transport unit TEi a positional proportion $\Delta li$ at both ends. The position component $\Delta li$ in the conveying direction x in front and behind the transport unit TEi may also be different. This positional proportion $\Delta li$ can also be dependent on the dimensions of the transport unit TEi.

The minimum distance M, thus to be maintained between two transport units TEi, TEi+1, where at least one of them is moved on a curved conveyor section FAk, can then result analogous to the minimum distance for a straight section from the two extensions ii, li+1 in the conveying direction x and the two positional proportions $\Delta li$, $\Delta li+1$ at the corresponding ends of two transport units TEi, TEi+1, that is, for example, $M=[(q_{i+1} \cdot li+1+\Delta li+1)+((1-q_i) \cdot li+\Delta li)]$. If the two transport units TEi, TEi+1 extend with equal width in the conveying direction x and against the conveying direction x relative to the reference points RPi, RPi+1, the determination of the minimum distance M can be simplified, for example as $M=li/2+\Delta li+li+1/2+\Delta li+1$. For a transport unit TEi+1 on a straight section, the positional proportion $\Delta li+1$ in front of and behind the transport unit TEi+1 may be zero. For a transport unit TEi on a curved section, a specific positional proportion $\Delta li$ in front of and behind the transport unit TEi (which may also be the same) can be determined.

As the dimensions of the transport units TEi, TEi+1 (possibly with the conveyed part 6) are naturally known, as well as the geometry of the conveyor line 2, the deflections of the transport units TEi, TEi+1 can be easily calculated at different positions along the conveyor line 2, optionally also depending on the dimensions of the transport units TEi, TEi+1. From this, the required position portion $\Delta li$, $\Delta li+1$ for a transport unit TEi, TEi+1 at each desired position, or just for different conveying sections FAk (e.g. straight, curved), can then be determined. The positional proportions $\Delta li$, $\Delta li+1$ can then be assigned to each transport unit TEi, TEi+1, for example in the control of the conveyor 1, for example in the conveyor control 5 or in a collision monitoring unit 7 (hardware and/or software), depending on the position, and optionally also be stored as a function of the dimensions of the transport units TEi, TEi+1. Since only a limited number of different transport units TEi, TEi+1 will be present, this can, of course, be simplified in that only the position parts $\Delta li$, $\Delta li+1$ of the various transport units TEi, TEi+1 are stored and then only the correct position portion $\Delta li$, $\Delta li+1$ must be read, which is easy to implement. Alternatively, a formula or a mathematical model can also be stored in the control in order to calculate the respective current positional proportion $\Delta li$, $\Delta li+1$ from the respective position (e.g. from the current curvature), and possibly also from the dimensions of a transport unit TEi.

But it can also be checked when two transport units TEi, TEi+1, wherein at least one is moved on a curved conveyor section FAk, traveling in succession collide, for example, based on a simulation of the movements of the transport units TEi, TEi+1 along the conveyor line 2. From this, too, a minimum distance M to be observed or a positional proportion $\Delta li$, $\Delta li+1$ can be determined.

The transport units TEi, TEi+1 can also be modeled by simple two-dimensional objects that respectively surround the outer contours of the transport units TEi, TEi+1 (possibly with part 6). Thereby the extensions li, li+1 can result or a simulation of the movement can be simplified. Advantageously, a rectangle with an extent in the conveying direction x and an extent against the conveying direction x can be used, wherein the rectangle surrounds the shape of the transport unit TEi completely. But there are also other geometric objects conceivable. Likewise, the actual shape of the transport units TEi, TEi+1 (possibly with part 6) can be used to determine or set the minimum distance M or a positional proportion $\Delta li$, $\Delta li+1$.

A particularly easy-to-implement embodiment will be described with reference to FIG. 5. Here, the transport units TEi, TEi+1 are considered as rectangles, although other forms are conceivable. The radially inwardly facing points Pi, Pi+1 on the transport units TEi, TEi+1 are projected with a simple radial projection through the center of curvature of the curved conveyor section FAk onto the reference path RA (radius of curvature with radius r). This results in projected extensions $e_i$, $e_{i+1}$ of the transport units TEi, TEi+1 tangentially to the curve with radius r. These projected extensions simply result from $e_i=(1-q_i)li \ r/r_i$ and $e_{i+1}=q_{i+1}li+1 \ r/r_{i+1}$, wherein the radii $r_i$, $r_{i+1}$ result from the widths of the transport units TEi, TEi+1 (possibly with part 6) and the reference points RPi, RPi+1. The minimum distance M to be maintained at the reference path RA then follows from $M=e_i+e_{i+1}$. If only one of the two transport units TEi, TEi+1 is located on a curved conveyor section FAk, FAk+1, it is of course sufficient to determine the projected extension in the direction of the other transport unit only for this transport unit. For the other transport unit TEi, TEi+1 on a straight section, the projected extension e corresponds to the actual extension q·1 or (1−q)·1.

If the curved conveyor section FAk should have a variable curvature, then in the simplest case for the above determination of the minimum distance M by means of radial projection, simply a circle with the largest radius of a circle of curvature at the curved conveyor section FAk or a part thereof can be used.

If in a curve, conveyor sections FAk, FAk+1 should be provided on both sides as seen in the conveying direction x, then a consideration of the radially inner conveyor section FAk may be sufficient for determining the minimum distance M to be maintained in the area of the curve.

In the manner described above, compliance with a minimum distance M can be checked when transport units TEi, TEi+1 move through a switch W, as will be explained with reference to FIG. 6. In the area of a switch W, there are always two conveyor sections FAk, FAk+1, at least one of which is curved. A passage of the two transport units TEi, TEi+1 on the same curved conveyor section FAk, FAk+1 then corresponds to the embodiment of FIG. 3 or FIG. 5 and can be easily handled as described above by determining and checking the minimum distance M to be maintained depending on the position and/or on the dimensions of the transport units TEi, TEi+1.

Figure 6:
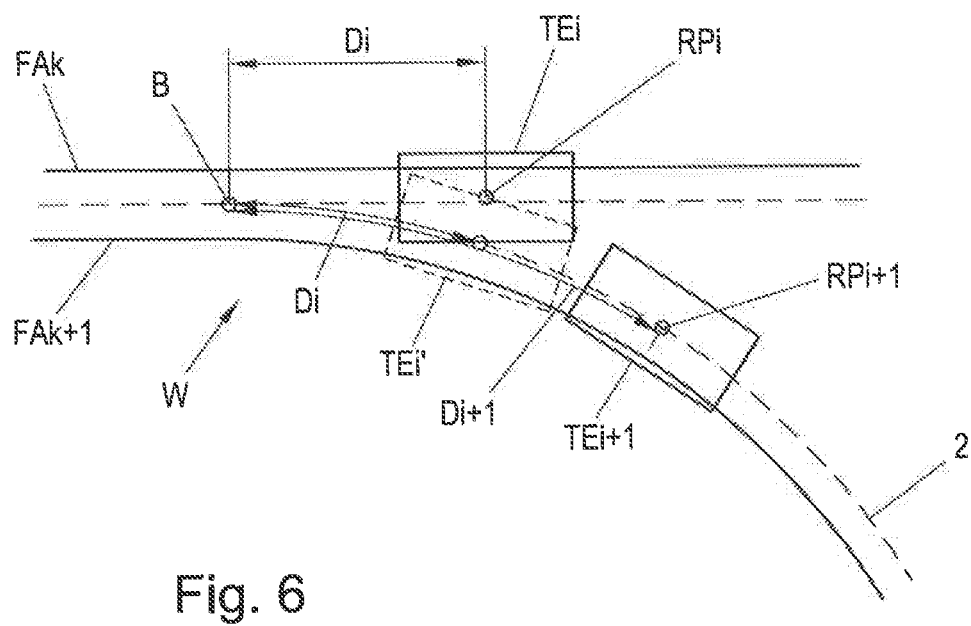
FIG. 6 shows a switch of the conveyor line with two transport units.

A passage of the two transport units TEi, TEi+1 through the switch on different conveyor sections FAk, FAk+1 as indicated in FIG. 6 can be accomplished by projecting a transport unit TEi on a conveyor section FAk onto the respective other conveyor section FAk+1, for example in the collision monitoring unit 7. Thus, the projected transport unit TEi' virtually appears on the respective other conveyor section FAk+1, whereby compliance with the minimum distance M can be checked again. For example, the distance Di of a transport unit TEi on the conveyor section FAk to a start of the switch B can be used for the projection and this transport unit TEi can be projected onto the other conveyor section FAk+1 with the same distance Di to the start of the switch B. The switch start B is, for example, the point at which the two conveyor sections FAk, FAk+1 in the area of the switch begin to diverge. However, in the area of the switch W, the minimum distance M in this case is usually to be determined differently.

When two transport units TEi, TEi+1 in the area of the switch W are moved on different conveyor sections FAk, FAk+1, at least one transport unit TEi, TEi+1 may again deflect due to the movement on a curved section. This deflection may cause the distance between the two transport units TEi, TEi+1 to change. This state also depends on the geometry of the switch W itself, i.e. on the arrangement and the geometry (especially the curvature) of the two conveyor sections FAk, FAk+1 in the area of the switch W. For example, a switch W with a straight conveyor section FAk and a curved conveyor section FAk+1 will have different minimum distance requirements M than a switch with two curved conveyor sections FAk, FAk+1. This minimum distance M between two transport units TEi, TEi+1 to be maintained, determined by the geometry of the switch, can also be determined mathematically or by simulation (for example, again with a two-dimensional objects surrounding the transport unit TEi, TEi+1, possibly together with part 6).

For the collision avoidance in the area of the switch W the larger of the two minimum distances M for a passage on the same conveyor section FAk, FAk+1 or on different conveyor sections FAk, FAk+1 can then be used as the minimum distance M to be maintained for a certain combination of transport units TEi, TEi+1. Alternatively, one could also distinguish the two cases and use the respectively appropriate minimum distance M for the travel through the switch.

For the minimum distance M, of course, a safety distance can additionally be added, for example, to account for control errors (position errors) or defined safety reserves. Likewise, the safety distance may also have a proportion dependent on the current speed and the brake parameters of a transport unit TEi, TEi+1 (e.g. maximum possible deceleration) to ensure that a transport unit TEi+1 traveling in succession may also stop before a preceding transport unit TEi without collision.

The minimum distances M and/or position proportions $\Delta l_i$, $\Delta l_{i+1}$ can be determined in advance for different positions or position ranges along the conveyor line 2, and possibly also for different pairs of transport units TEi, TEi+1 (because of the dimensions and/or the transported parts 6) and stored in a memory to be read out as needed during operation of the conveyor 1. Alternatively, the minimum distances M to be maintained can also be determined continuously during the operation of the conveyor 1, for example in each time step of the control of the movement of the transport units TEi, TEi+1.

It can also be checked in each time step of the control whether the minimum distance M to be maintained is maintained by the current setpoint value of the control (e.g. a setpoint position or a setpoint speed). If the minimum distance M is not maintained, a specific, configured action can be set. For example, the movement of a transport unit TEi, TEi+1 can be limited, for example by not regulating to the desired setpoint speed or setpoint position, or even by stopping a transport unit TEi, TEi+1.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The invention claimed is:

1. A method for operating a conveyor in the form of a long stator linear motor with a conveyor line, along which at least two transport units are moved in succession, comprising:
   checking, during the movement of the two transport units, whether a predetermined minimum distance between the two transport units is maintained in order to avoid a collision of the two transport units,
   wherein the minimum distance to be maintained is changed in dependence on a position of the two transport units along the conveyor line, and
   wherein the minimum distance is determined from extensions of the two transport units in the conveying direction and a positional proportion is added to an extension of at least one transport unit on a curved conveyor section depending on a position and/or depending on a dimension of the at least one transport unit, and wherein, for a preceding transport unit of the at least two transport units, a largest extension of the preceding transport unit related to a reference point of the preceding transport unit against the conveying direction and, for a successive transport unit of the at least two transport units traveling in succession to the preceding transport unit, a largest extension of the successive transport unit related to a reference point of the successive transport unit in the conveying direction are determined and the minimum distance is determined as the sum of the two dimensions in and against the conveying direction and of the at least one positional proportion.

2. The method according to claim 1, wherein the minimum distance to be maintained is changed in dependence on the dimensions of the two transport units.

3. The method according to claim 1, wherein the minimum distance is determined as the sum of the respective half extension of the two transport units in the conveying direction and of the at least one positional proportion.

4. The method according to claim 1, wherein a positional proportion in front and behind the transport unit, as seen in the conveying direction, is different.

5. The method according to claim 1, wherein for a transport unit on a curved conveyor section, with a radial projection through a center of curvature of the conveyor section an extension of the transport unit in the direction of the conveying direction projected onto a reference path is determined and the minimum distance is determined with this projected extension.

6. The method according to claim 1, wherein for a passage of two transport units traveling in succession through a switch with two conveyor sections, wherein each of the two transport units in the area of the switch is moved on another conveyor section, a transport unit on the conveyor section is projected on the respective other conveyor section, and wherein the maintenance of the minimum distance between the projected transport unit and the other transport unit is checked.

7. The method according to claim 6, wherein when determining the minimum distance in the area of the switch, the geometry of the switch is taken into account.

8. A conveyor in the form of a long stator linear motor having a conveyor line along which at least two transport units are moved in succession, comprising:

a collision monitoring unit which checks during the movement of the two transport units the maintenance of a predetermined minimum distance in order to avoid a collision of the two transport units, wherein the minimum distance to be maintained is modifiable in the collision monitoring unit in dependence on a position of the two transport units along the conveyor line, wherein it is provided to determine the minimum distance from extensions of the two transport units in the conveying direction and to add a positional proportion to an extension of at least one transport unit on a curved conveyor section depending on a position and/or depending on a dimension of the at least one transport unit, and wherein, for a preceding transport unit of the at least two transport units, a largest extension of the preceding transport unit related to a reference point of the preceding transport unit against the conveying direction and, for a successive transport unit of the at least two transport units traveling in succession to the preceding transport unit, a largest extension of the successive transport unit related to a reference point of the successive transport unit in the conveying direction are determined and the minimum distance is determined as the sum of the two dimensions in and against the conveying direction and of the at least one positional proportion.

9. The method according to claim 8, wherein the minimum distance to be maintained is modifiable in the collision monitoring unit as a function of the dimensions of the two transport units.

* * * * *